United States Patent
Shelly (10) Patent No.: US 10,047,872 B2
(45) Date of Patent: *Aug. 14, 2018

(54) PILOT VALVE CONTROLLED POSITIVE AND NEGATIVE PRESSURE RELIEF VALVES

(71) Applicant: The Boeing Company, Chicago, IL (US)

(72) Inventor: Mark Alan Shelly, Bel Aire, KS (US)

(73) Assignee: The Boeing Company, Chicago, IL (US)

( * ) Notice: Subject to any disclaimer, the term of this patent is extended or adjusted under 35 U.S.C. 154(b) by 9 days.

This patent is subject to a terminal disclaimer.

(21) Appl. No.: 15/256,729

(22) Filed: Sep. 5, 2016

(65) Prior Publication Data

US 2016/0369907 A1    Dec. 22, 2016

Related U.S. Application Data

(63) Continuation of application No. 13/440,494, filed on Apr. 5, 2012, now Pat. No. 9,435,449.

(51) Int. Cl.
*F16K 17/10* (2006.01)
*B60K 15/035* (2006.01)
(Continued)

(52) U.S. Cl.
CPC ........ *F16K 17/10* (2013.01); *B60K 15/03519* (2013.01); *F16K 17/196* (2013.01); *G05D 16/10* (2013.01); *B60K 2015/03296* (2013.01); *Y10T 137/0379* (2015.04); *Y10T 137/7764* (2015.04); *Y10T 137/7771* (2015.04)

(58) Field of Classification Search
CPC ........ F16K 17/10; F16K 17/04; F16K 17/196; F16K 17/105; B65D 51/1644; B65D 51/1633; B65D 51/16; G05D 16/10; G05D 16/103; G05D 16/166; Y10T 137/7771; Y10T 137/7778; Y10T 137/7758;
(Continued)

(56) References Cited

U.S. PATENT DOCUMENTS 4,351,350 A * 9/1982 Crute ..................... F16K 17/36
137/39
4,977,925 A * 12/1990 Tiefenthaler .......... F16K 17/105
137/489.5

(Continued)

*Primary Examiner* — Michael R Reid
(74) *Attorney, Agent, or Firm* — Miller, Matthias & Hull LLP (57) ABSTRACT

Concepts and technologies disclosed herein for relief valves ("relief valves"). A relief valve can include a flow path, a primary valve poppet that is urged or biased into a closed position by a tensioned spring, and a pilot valve in communication with a valve compartment of the relief valve. When an exterior space pressure overcomes the tensioned spring, the primary valve poppet can be overcome and pressure between an interior space and the exterior space can equalize, at least partially. When the pressure within the interior space increases beyond a defined threshold, which can be defined by a spring of the pilot valve, the pilot valve can open, the valve compartment can vent, and the tensioned spring again can be overcome and can open to allow at least partial equalization of pressures within the interior space and the exterior space.

21 Claims, 7 Drawing Sheets

(51) Int. Cl.
*G05D 16/10* (2006.01)
*F16K 17/196* (2006.01)
*B60K 15/03* (2006.01)

(58) Field of Classification Search
CPC ......... Y10T 137/7769; Y10T 137/7764; Y10T 137/777; B60K 15/03519
USPC ......... 137/493, 493.7, 485, 492, 489, 492.5, 137/81.1; 251/28, 30.3; 220/203.19, 220/203.23, 203.24, 203.27, 203.28, 220/203.01
See application file for complete search history.

(56) References Cited

U.S. PATENT DOCUMENTS

| | | | | |
|---|---|---|---|---|
| 6,296,013 | B1 * | 10/2001 | Hosono | ............... F15B 11/0413 |
| | | | | 137/454.5 |
| 6,955,331 | B2 * | 10/2005 | Larsen | .................. F16K 31/406 |
| | | | | 251/30.01 |
| 9,435,449 | B2 * | 9/2016 | Shelly | ..................... F16K 17/10 |

\* cited by examiner

PILOT VALVE CONTROLLED POSITIVE AND NEGATIVE PRESSURE RELIEF VALVES

CROSS-REFERENCE TO RELATED APPLICATION

This application is a continuation of co-pending U.S. patent application Ser. No. 13/440,494, filed on Apr. 5, 2012, entitled "Pilot Valve Controlled Positive And Negative Pressure Relief Valves", which is hereby incorporated by reference in its entirety.

TECHNICAL FIELD

The present disclosure relates generally to pressure relief valves and, more particularly, to pilot valve controlled positive and negative pressure relief valves.

BACKGROUND

Pressure relief valves are sometimes used to regulate or control pressure of a structure. Generally speaking, a pressure relief valve can include a poppet or other structure connected to a spring. The poppet can be placed into a valve, cylinder, or other structure that can be used to provide a valve body for the pressure relief valve. The spring can be configured such that the spring has a tension that approximately matches a pressure at which the pressure relief valve is to open. For example, a spring can be configured to apply a force of about five pounds per square inch to the poppet. As the tank pressure approaches or exceeds five pounds per square inch, the pressure in the tank can overcome the pressure relief valve spring and can cause the pressure relief valve to open, thereby relieving pressure within the tank. A pressure relief valve also can be used to regulate negative pressures by inverting the structure of the pressure relief valve so that an ambient pressure works against the spring instead of an internal pressure.

In some applications, a narrow range of operating pressures can result in a requirement for very exact spring selection or tensioning and/or other mechanisms to ensure proper operation of the pressure relief valves. Because mechanical devices such as springs, poppets, and the like may not be exact, may wear over time, and/or otherwise may not provide exact tensions or otherwise perform optimally, pressure relief valves may open at pressures above or below the target pressures and/or may progressively open until the valve is completely open at the target pressure. If exact pressures are needed, for example for pressurized fuel systems or other closed vessel applications, such pressure relief valves can adversely affect performance or cause other problems.

Similarly, in operation, a pressure within the tank or other regulated or controlled structure may not be constant or predictable. For example, the pressure within a fuel tank, for example, may not increase gradually and/or in a smooth manner. Rather, the pressure in the tank may approach the target pressure and may have periodic excursions into or near pressure values that can cause the valve to open partially and/or completely. Routine excursions into the range at which the valve begins to relieve may cause some fluttering or leaking of the valve.

It is with respect to these and other considerations that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

According to one aspect of the embodiments disclosed herein, a pilot valve controlled positive and negative pressure relief valve ("relief valve") is disclosed. The relief valve can include a valve body that defines a valve compartment for providing a fluid pathway between a first space and a second space. The relief valve can further include a primary valve poppet located within the valve compartment and a poppet shaft bore annulus formed in the valve compartment. The poppet shaft bore annulus can be configured to allow pressure equalization between the valve compartment and the first space. The relief valve also can include a primary valve poppet spring located within the valve compartment. The primary valve poppet spring can be configured to bias the primary valve poppet into a sealed position at which the fluid pathway is obstructed. The relief valve also can include a pilot valve having an opening into the valve compartment and a further opening into an ambient pressure sense line between the pilot valve and an exterior space. The relief valve can be configured to at least partially relieve a pressure differential between the first space and the second space.

According to another aspect of the embodiments disclosed herein, a fuel tank including a pilot valve controlled positive and negative pressure relief valve is disclosed. The relief valve can include a valve body that defines a valve compartment. The valve compartment can be configured to provide a fluid pathway between an interior space of a fuel tank and an exterior space. The relief valve also can include a primary valve poppet located within the valve compartment and a poppet shaft connected to the primary valve poppet. At least a portion of the poppet shaft can be configured to pass through a poppet shaft bore annulus that can be configured to allow fluid flow between the interior space and the valve compartment. The relief valve also can include a primary valve poppet spring located within the valve compartment. The primary valve poppet spring can be configured to bias the primary valve poppet into a sealed position at which the fluid pathway is obstructed. The relief valve also can include a pilot valve including an opening into the valve compartment and a further opening into an ambient pressure sense line between the pilot valve and an exterior space. The relief valve can be configured to at least partially relieve a pressure differential between the interior space and the exterior space.

According to yet another aspect of the embodiments disclosed herein, a method for regulating pressure of a structure using a pilot valve controlled positive and negative pressure relief valve is disclosed. The method can include determining an operating pressure range associated with the structure. The operating pressure range can include a pressure range between a positive pressure threshold value and a negative pressure threshold value. The method also can include determining, based upon the operating pressure range, a crack pressure of the relief valve, wherein determining the crack pressure includes executing a crack pressure determination module at a computer to determine the crack pressure. The method also can include fabricating the relief valve based, at least partially, upon the determined crack pressure, and equipping the structure with the relief valve.

The features, functions, and advantages discussed herein can be achieved independently in various embodiments of the concepts and technologies disclosed herein, or may be combined in yet other embodiments, further details of which can be seen with reference to the following description and drawings.

DETAILED DESCRIPTION

The following detailed description is directed to pilot valve controlled positive and negative pressure relief valve ("relief valve"). According to various embodiments disclosed herein, the pilot valve can be used to relieve positive pressure and can be passive in negative pressure scenarios. Alternatively, the pilot valve can be reversed and can be used to relieve negative pressure and can be passive in positive pressure scenarios. Although embodiments are contemplated in which the pilot valve can be used in positive and negative pressure relief scenarios, the illustrated embodiments show a pilot valve that is used to relieve only positive pressure scenarios and that his passive in negative pressure relief scenarios. As such, the phrase "pilot valve controlled" is used herein to refer to the relief valve in general, and not to a negative or positive pressure.

The relief valve includes a valve body having one or more pressure flow paths such as apertures, vents, openings, or the like, via which pressure between an interior space and an exterior space can be allowed to flow, migrate, and/or equalize. In some embodiments, the valve body also includes a poppet shaft bore annulus that provides a path for a poppet shaft of a primary valve poppet as well as providing a flow path between a valve compartment and the interior space. In various implementations, the relief valve includes a primary valve poppet located within the valve body and attached to the poppet shaft. A primary valve poppet spring is located within the valve body and/or the valve compartment. The primary valve poppet spring can be configured to urge the primary valve poppet into a closed position to create a valve seal between the interior space and the exterior space.

According to various embodiments of the concepts and technologies disclosed herein, the relief valve further includes a pilot valve. The pilot valve includes a pilot valve body, a pilot valve seal, a pilot primary valve poppet, and a pilot valve spring for urging the pilot primary valve poppet into a closed position. The pilot valve, when opened, can create a flow path between the valve compartment and the exterior space by way of an ambient pressure sense line between the pilot valve body and the exterior space.

In operation, as positive pressure builds in the tank, the tank pressure builds in the valve compartment and supplements pressure generated by the poppet spring to force the primary valve poppet into the closed position. The pilot valve can be exposed to the interior space and can be configured to open at a specified pressure that can be close to, identical to, or unrelated to the desired opening pressure of the primary valve poppet. When the interior space reaches the designated pressure, the pilot valve can open and pressure from the valve compartment can be vented through the ambient pressure sense line to the exterior space. After the pressure differential is relieved, the pilot valve and/or the primary valve poppet can reseat or close. As such, the relief valve can be self-resetting in various embodiments.

With the venting of the valve compartment, the interior space pressure can overcome the primary valve poppet spring. In particular, the interior space can include an area around at least a portion of the primary valve poppet and therefore can urge the primary valve poppet open when the valve compartment pressure is relieved. Thus, opening of the primary valve poppet can be precisely controlled by including the pilot valve to control the pressure of the valve compartment.

Similarly, the relief valve can be used to control negative pressure scenarios. In particular, as the pressure in the exterior space exceeds the pressure of the interior space, a force against the primary valve poppet can be created by the exterior space. When the ambient pressure reaches a pressure that overcomes the primary valve poppet spring, the primary valve poppet can be urged open, and a differential between the pressure of the interior space and the pressure of the exterior space can be reduced. After the pressure differential is partially or completely relieved, as configured during design of the relief valve, the primary valve poppet can reseat or close. As such, the relief valve can be self-resetting in various embodiments. As such, various embodiments of the relief valve disclosed herein can control positive and negative pressure scenarios associated with the tank. These and other advantages and features will become apparent from the description of the various embodiments below.

In the following detailed description, references are made to the accompanying drawings that form a part hereof and that show, by way of illustration, specific embodiments or examples. In referring to the drawings, like numerals represent like elements throughout the several figures.

Figure 1:
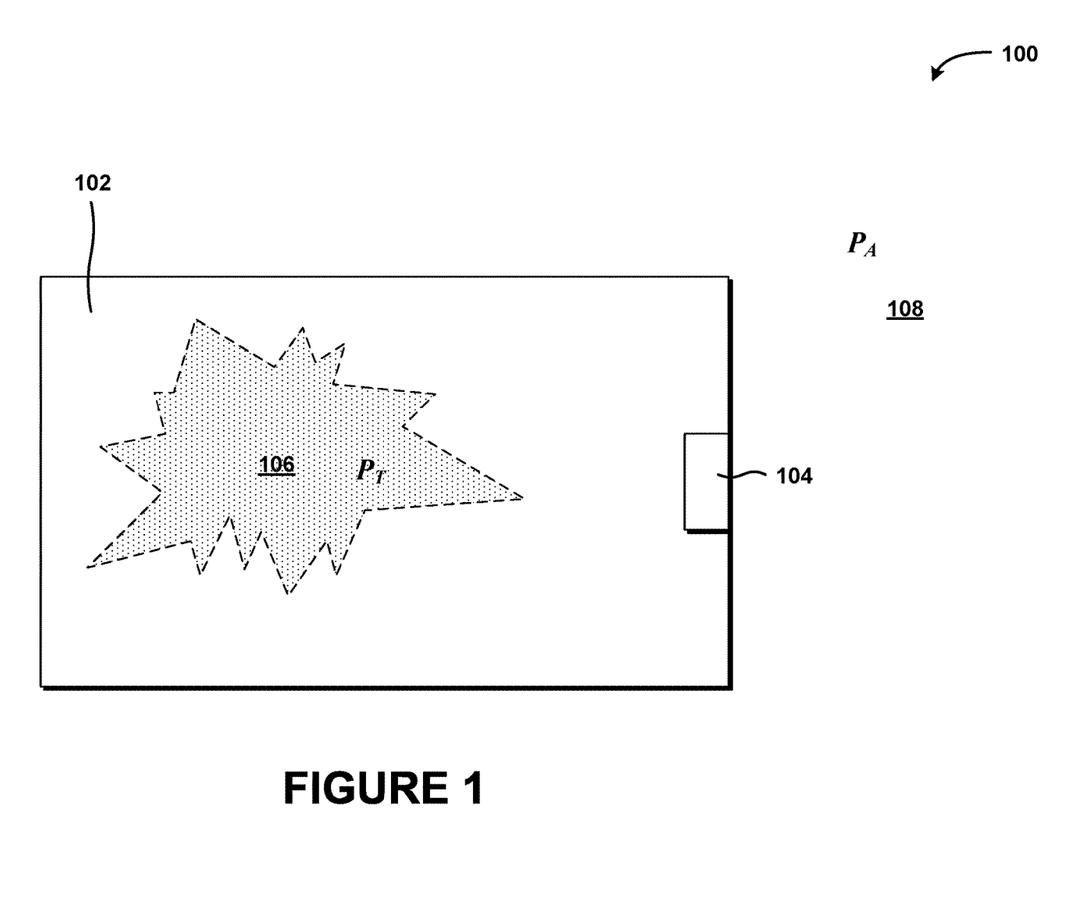
FIG. 1 is a system diagram illustrating an illustrative operating environment for the various embodiments disclosed herein.

Referring now to FIG. 1, an illustrative operating environment 100 for various embodiments of the concepts and technologies disclosed herein is illustrated. The operating environment 100 includes a tank, space, or other structure (hereinafter referred to as a "tank") 102. According to various embodiments, the tank 102 includes a fuel tank, a water tank, a gaseous tank for other fluids such as air, a chemical storage tank, a room, a vehicle environment, or another structure that can be used to house compressible and/or non-compressible liquids, gases, or other fluids and/or or other substances. As such, while the specification refers to a "tank," it should be understood that the concepts and technologies disclosed herein can be embodied in various structures or spaces. As such, the illustrated and described embodiments should be understood as being illustrative of the concepts and technologies disclosed herein, and should not be construed as being limiting in any way.

In one contemplated embodiment, the functionality of the tank 102 is provided by a vehicle fuel tank such as an aircraft, automobile, or other vehicle fuel tank. It should be understood, however, that this embodiment is illustrative and should not be construed as being limiting in any way. It therefore should be understood that the concepts and technologies disclosed herein can apply to stationary and/or transportable or mobile tanks or pressure vessels. In particular, the functionality of the tank 102 can be provided by various types of containers or other structures for holding or storing fluids such as gases, liquids, chemicals, powders, and/or other materials. For purposes of describing various aspects of the concepts and technologies disclosed herein, the tank 102 is described herein as storing fuel. In light of the various other embodiments of the tank 102, it should be understood that this embodiment is illustrative, and should not be construed as being limiting in any way.

The tank 102 can include or can be connected to a pilot valve controlled positive and negative pressure relief valve (hereinafter referred to as a "relief valve") 104. The relief valve 104 can be used to regulate pressure differentials between a first environment or space (hereinafter referred to as an "interior space") 106 and an exterior space (hereinafter referred to as an "exterior space") 108. In some implementations, the interior space 106 includes a tank environment of a fuel tank or other structure. In other embodiments, the interior space 106 includes a first tank, structure, or space, and the exterior space 108 includes a second tank, structure, or space. In some illustrative embodiments, the exterior space 108 includes an outdoor area, if the tank 102 is located outdoors; a ground environment, if the tank 102 is located underground; a vehicle environment, if the tank 102 is located within a vehicle; and/or other environments. According to one contemplated embodiment, the tank 102 is located within a chassis or body structure of an aircraft or other vehicle, and the exterior space 108 therefore can include an in-vehicle environment. It should be understood that this embodiment is illustrative, and should not be construed as being limiting in any way.

As shown in FIG. 1, the interior space 106 can be pressurized and/or otherwise can be configured to operate at a tank pressure $P_T$. According to various embodiments, the tank pressure $P_T$ can be regulated by the relief valve 104, as will be explained in more detail below. Similarly, the exterior space 108 can have an ambient pressure $P_A$. According to various embodiments of the concepts and technologies disclosed herein, the relief valve 104 can be configured to regulate or control a pressure differential between the interior space 106 and the exterior space 108, i.e., a differential between the ambient pressure $P_A$ and the tank pressure $P_T$.

In particular, various embodiments of the relief valve 104 can be configured to control the pressure differential between the interior space 106 and the exterior space 108 by relieving a positive pressure of the interior space 106 if the tank pressure $P_T$ exceeds a defined positive pressure threshold. In some other embodiments, the relief valve 104 can be configured to control the pressure differential between the interior space 106 and the exterior space 108 by relieving a negative pressure of the interior space 108 if the tank pressure $P_T$ drops below a defined negative pressure threshold. As such, the relief valve 104 can be configured to open at or beyond a defined positive pressure threshold and/or at or beyond a defined negative pressure threshold. Various aspects of the relief valve 104 and operation of the relief valve 104 to control pressure of the interior space 106 are illustrated and described in more detail below with reference to FIGS. 2-7.

Figure 2:
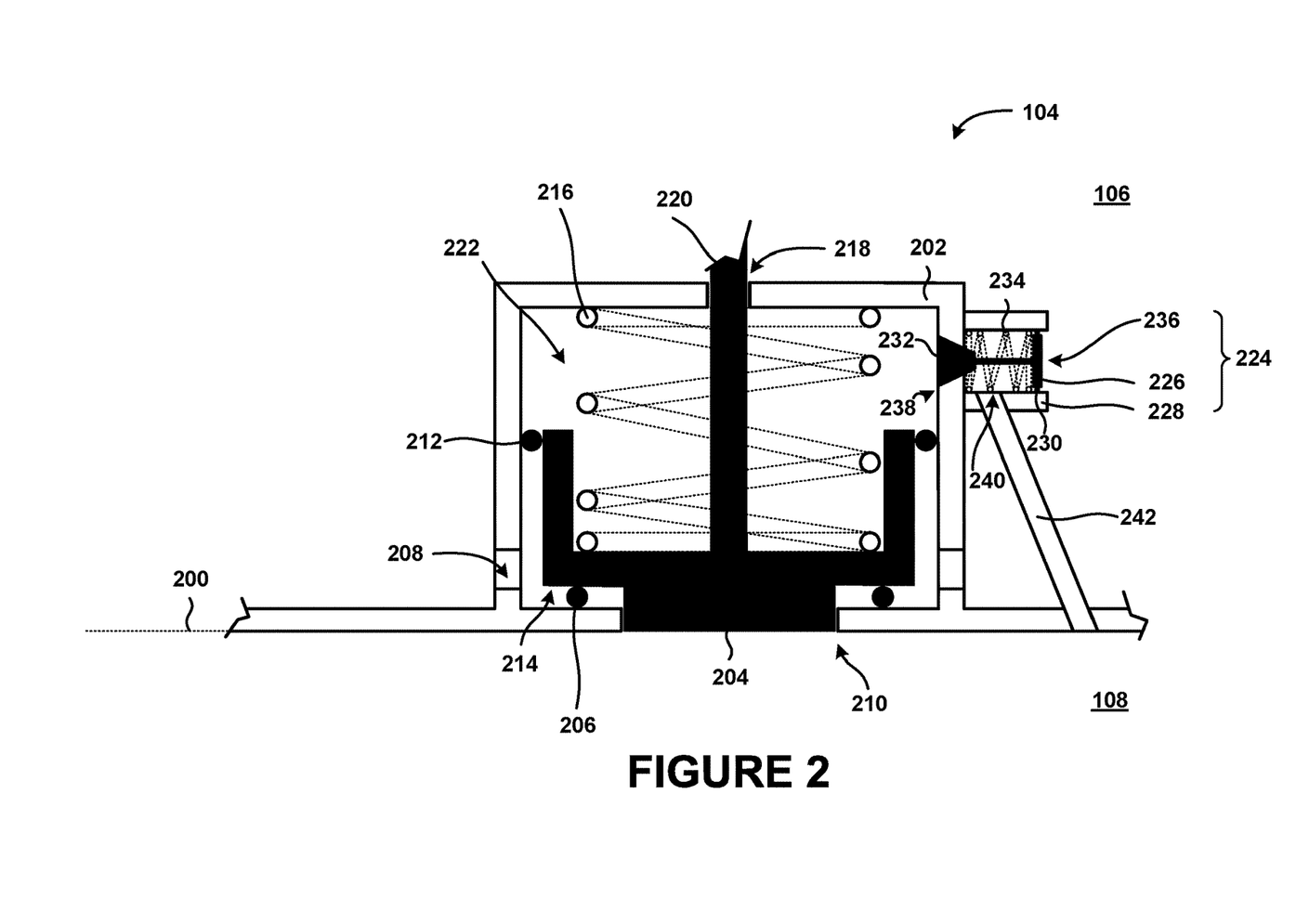
FIG. 2 is a line drawing showing aspects of a pilot valve controlled positive and negative pressure relief valve, according to an illustrative embodiment.

Turning now to FIG. 2, additional aspects of the relief valve 104 are described in detail. In particular, FIG. 2 is a line drawing showing the relief valve 104 according to one illustrative embodiment. Because various aspects of the relief valve 104 can be adjusted for particular implementations of the relief valve 104, the illustrated structure should be understood as being illustrative of one embodiment and should not be construed as being limiting in any way.

As explained above with reference to FIG. 1, the relief valve 104 can be disposed within or at a tank boundary 200 of a tank 102 or another structure. In some embodiments, including the embodiment illustrated in FIG. 2, a valve body 202 can be disposed within a tank 102 or another space, area, location, or structure. In some embodiments, at least a portion of the valve body 202 can be defined by and/or can coincide with a tank boundary 200. Furthermore, as illustrated in FIGS. 1-2, at least a portion of the relief valve 104 can be located within the tank 102. It should be understood that these embodiments are illustrative, and should not be construed as being limiting in any way.

The valve 104 can include a primary valve poppet 204. The primary valve poppet 204, or a portion thereof, can be configured to engage a valve seal 206 located within the relief valve 104. Thus, the primary valve poppet 204 can cooperate with the valve seal 206 to seal the interior space 106 and/or to insulate the interior space 106 from the exterior space 108. In the illustrated embodiment, the valve seal 206 is illustrated as an annular o-ring or similar structure. It should be understood that this embodiment is illustrative, and should not be construed as being limiting in any way. In particular, the functionality of the valve seal 206 can be provided by one or more diaphragms, bellaphragms, chevron seals, t-seals, quad seals, gaskets, other structures, combinations thereof, or the like.

The valve body 202 also can include one or more flow paths 208 for allowing migration, flow, and/or equalization of pressures between the interior space 106 and the exterior space 108 via a main relief valve outlet 210 that can be sealed by the primary valve poppet 204. According to various embodiments, the functionality of the flow paths 208 can be provided by apertures, vents, or other openings via which fluids can flow between the interior space and the exterior space 108. Because other types of flow paths 208 are possible and are contemplated, it should be understood that these embodiments are illustrative, and should not be construed as being limiting in any way.

The primary valve poppet 204 also can include a poppet seal 212. The poppet seal 212 can be located such that the tank pressure $P_T$ can be exerted on the primary valve poppet 204 via the flow paths 208 and can be isolated to an area of the primary valve poppet 204 between the valve seal 206 and the poppet seal 212. This isolated area can include at least a portion 214 of the primary valve poppet 204. As can be seen in FIG. 2, a force exerted on the portion 214 can work directly against a primary valve poppet spring 216, which is described in more detail below.

As is generally understood, pressure acts in all directions. As such, at least the portion 214 of the primary valve poppet 204 can be exposed to the tank pressure $P_T$. Thus, when the tank pressure $P_T$ exceeds a threshold pressure defined for the primary valve poppet 204, which can be defined and/or matched by a tension of the primary valve poppet spring 216, the primary valve poppet 204 can be urged open by the tank pressure $P_T$, thereby opening the primary valve poppet 204. Depending upon the tension of the primary valve poppet spring 216 and/or other design considerations, the location of the valve seal 206 can be adjusted to expose more or less of the primary valve poppet 204 to the tank pressure $P_T$. As such, the valve seal 206 can be located such that at least a portion of the valve poppet 204 is exposed to the interior space and so that the tank pressure $P_T$ can act against the primary valve poppet spring 216.

Furthermore, as explained above, typical relief valves can open and/or close at values around or near a specified pressure due to various causes. As such, typical relief valves can fail to provide opening or closing at specified pressures. Various embodiments of the relief valve 104 disclosed herein, however, are configured to open and/or close at values that are substantially equal to desired operating ranges. To provide this functionality, the relief valve 104 can include a poppet shaft bore annulus 218 or another opening. The poppet shaft bore annulus 218 can be, but is not necessarily, configured to provide a passageway for movement of a poppet shaft 220 connected to, attached to, and/or formed as part of the primary valve poppet 204. In some embodiments, the poppet shaft 220 is configured to be contained within the valve body 202 and the poppet shaft bore annulus 218 can be omitted or can be replaced with an aperture or other opening. Some embodiments of the relief valve 104 that omit the poppet shaft bore annulus 218 are illustrated and described below with reference to FIGS. 5A and 5B.

The poppet shaft bore annulus 218 can be configured to allow passage, migration, movement, and/or equalization of pressures between the interior space 106 and a valve compartment 222 that includes an air space between the primary valve poppet 204 and the valve body 202, which can be defined, at least partially, by the tank boundary 200. The poppet shaft bore annulus 218 can be configured to provide a passageway for migration of the tank pressure $P_T$ into the valve compartment 222. As such, the primary valve poppet 204 can be subjected to the tank pressure $P_T$ from the top of the primary valve poppet 204, i.e., from within the valve compartment 222, as well as from the bottom of the primary valve poppet 204, as shown at the portion 214. It therefore can be understood that embodiments of the relief valve 104 are configured such that the primary valve poppet 204 can be held in place by an increasing force as the tank pressure $P_T$ increases and until a specified tank pressure $P_T$ is reached, as will be explained in more detail below.

The relief valve 104 also can include a pilot valve 224. The pilot valve 224 can include a pilot valve poppet ("pilot poppet") 226 disposed within a pilot valve body 228. A pilot valve poppet seal 230 can be located between the pilot poppet 226 and the pilot valve body 228. The functionality of the pilot valve poppet seal 230 can be provided by an annular seal such as an o-ring, as illustrated, or by various other structures as discussed above with respect to the valve seal 206 and/or the poppet seal 212. It should be understood that this embodiment is illustrative, and should not be construed as being limiting in any way.

The pilot poppet 226 can include a pilot valve seal 232. The pilot valve seal 232 can be urged into a closed position by a pilot valve spring 234. The pilot valve spring 234 can be configured to open the pilot valve 224 at a specified pressure by urging the pilot valve seal 232 into the closed position until the specified pressure is experienced at the exposed end 236 of the pilot valve 224 by closing the pilot poppet 226. When the pilot valve seal 232 is closed, a passageway or flow path ("pilot valve flow path") 238 between the valve compartment 222 and the interior of the pilot valve 224 can be obstructed by the pilot valve seal 232. From the illustrated embodiment shown in FIG. 2, it can be appreciated that the exposed end 236 of the pilot valve 224 can be exposed to the interior space 106. As such, the pilot valve 224 can be configured to open when a specified pressure is reached in the interior space 106.

Figure 3:
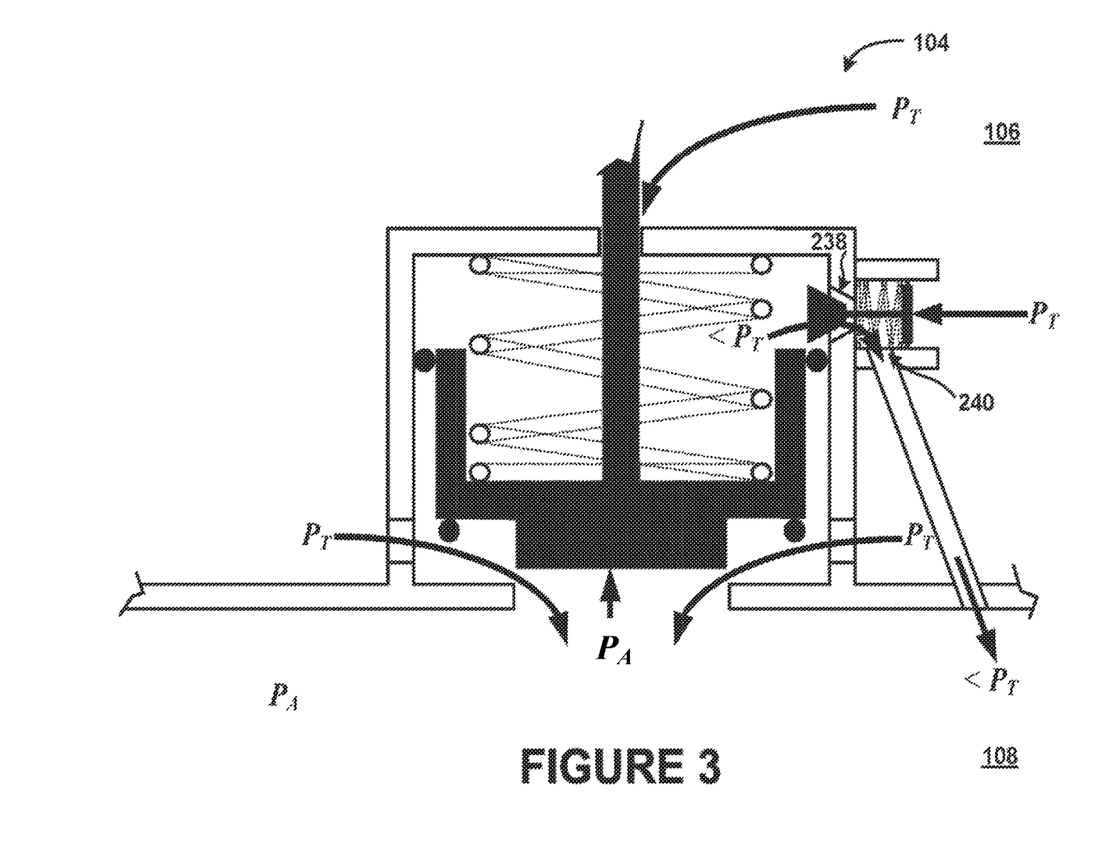
FIG. 3 is a line drawing showing additional aspects of the pilot valve controlled positive and negative pressure relief valve, according to an illustrative embodiment.

In the illustrated embodiment, the pilot valve body 228 can be connected to, mated to, and/or can include an opening, passageway, or flow path ("pilot valve vent opening") 240 that provides a vent from the pilot valve body 228 into an ambient pressure sense line 242. The ambient pressure sense line 242 can provide an outlet, when the pilot valve 224 is in the open position (as shown in FIG. 3), between the valve compartment 222 and the exterior space 108. As such, as the tank pressure $P_T$ increases, the primary valve poppet 204 can be pushed harder into the sealed position, as shown in FIG. 2.

With additional reference to FIGS. 3 and 4, operation of the relief valve in positive pressure and negative pressure scenarios will be described in detail. In a positive pressure scenario, i.e., when the tank pressure $P_T$ in the interior space 106 increases while the ambient pressure $P_A$ stays substantially constant, or increasing less rapidly than within the interior space 106, a pressure within the valve compartment 222 can increase. Similarly, because the exposed end 236 of the pilot valve 224 is exposed to the tank pressure $P_T$, the pressure exerted against the pilot poppet 226 can increase. When the tank pressure $P_T$ reaches a specified force equivalent to a crack pressure of the pilot valve 224, the pilot valve 224 can be pushed into an open position, thereby opening the pilot valve flow path 238. In some embodiments, this can occur or can be achieved by sizing the pilot shaft bore annulus 218 such that pressure migration into the valve compartment 222 can occur at a rate that is slower than a rate of increase in the force applied to the exposed end 236 of the pilot poppet 226. It should be understood that this embodiment is illustrative, and should not be construed as being limiting in any way.

When the pilot valve 224 opens, the pressure within the valve compartment 222 can vent out through the pilot valve flow path 238, into the pilot valve body 228, through the pilot valve vent opening 240, through the ambient pressure sense line 242, and to the exterior space 108. When this occurs, the tank pressure $P_T$ applied to the primary valve poppet 204 at the portion 214 can overcome the force applied by primary valve poppet spring 216 and the primary valve poppet 204 is thereby urged into the open position. When the primary valve poppet 204 moves into the open position, pressure within the interior space 106 can rapidly vent to or equalize with the exterior space 108 by moving through the flow paths 208. Venting of the interior space 106 through the flow paths 208 as described above is illustrated in FIG. 3. As such, the relief valve 104 can be used to regulate a positive pressure differential between the interior space 106 and the exterior space 108, i.e., a scenario in which the tank pressure $P_T$ exceeds a defined threshold and is vented to the exterior space.

The relief valve 104 also can be used to equalize or otherwise regulate or control pressure between the interior space 106 and the exterior space 108 in negative pressure scenarios, i.e., a scenario in which the ambient pressure $P_A$ exceeds the tank pressure $P_T$ and/or a defined negative pressure threshold for the relief valve 104. Operation of the relief valve 104 in a negative pressure scenario is illustrated in FIG. 4.

Figure 4:
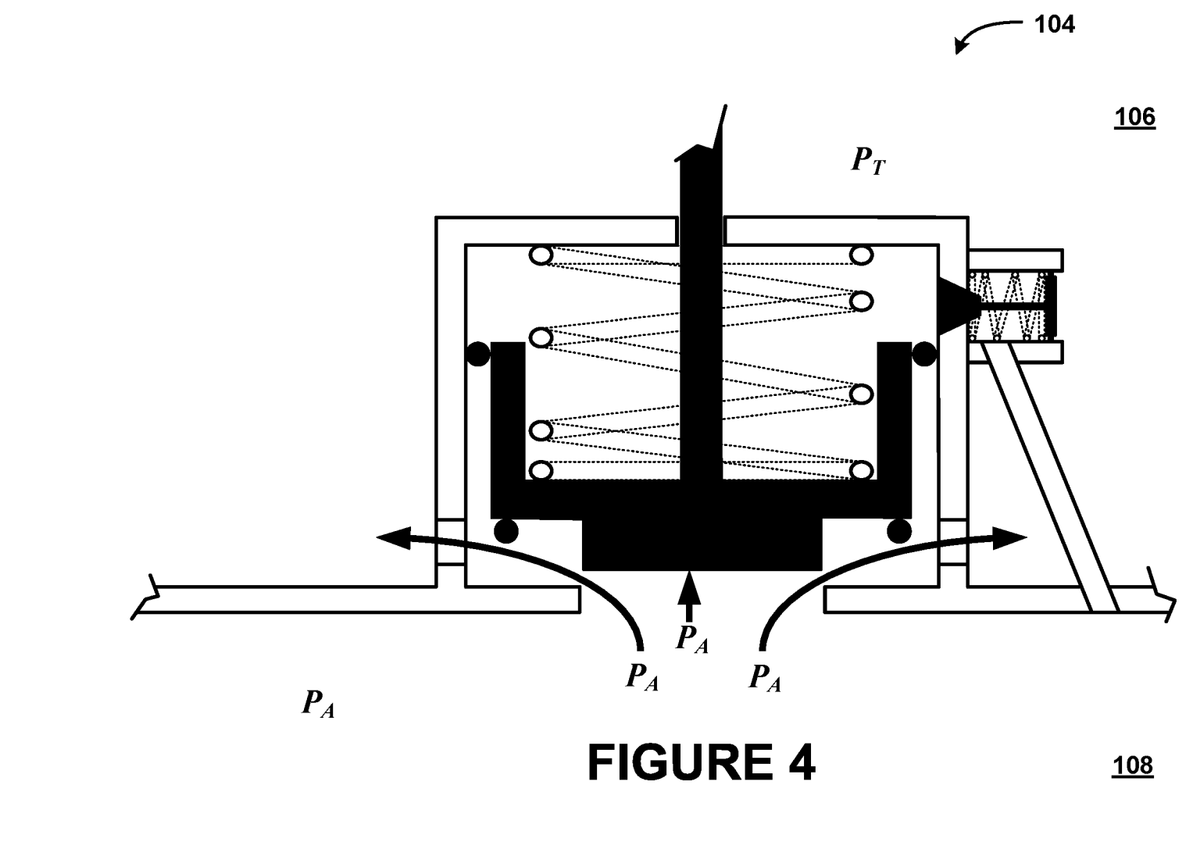
FIG. 4 is a line drawing showing additional aspects of the pilot valve controlled positive and negative pressure relief valve, according to an illustrative embodiment.

As shown in FIG. 4, when the ambient pressure $P_A$ approaches a crack pressure of the primary valve poppet spring 216, the ambient pressure $P_A$ can urge open the primary valve poppet 204 and allow ingress of pressurized fluid from the exterior space 108. As such, the relief valve 104 can provide two way operation. In other words, the relief valve 104 can provide regulation of or protection from positive pressures within the interior space 106 and/or from negative pressures within the interior space 106.

Figure 5A:
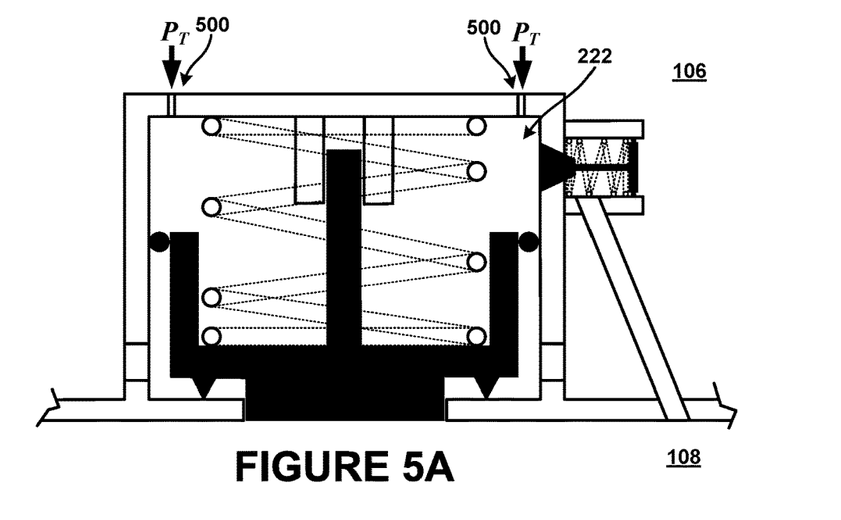
FIGS. 5A and 5B are line drawings showing additional embodiments of the pilot valve controlled positive and negative pressure relief valve.
Figure 5B:
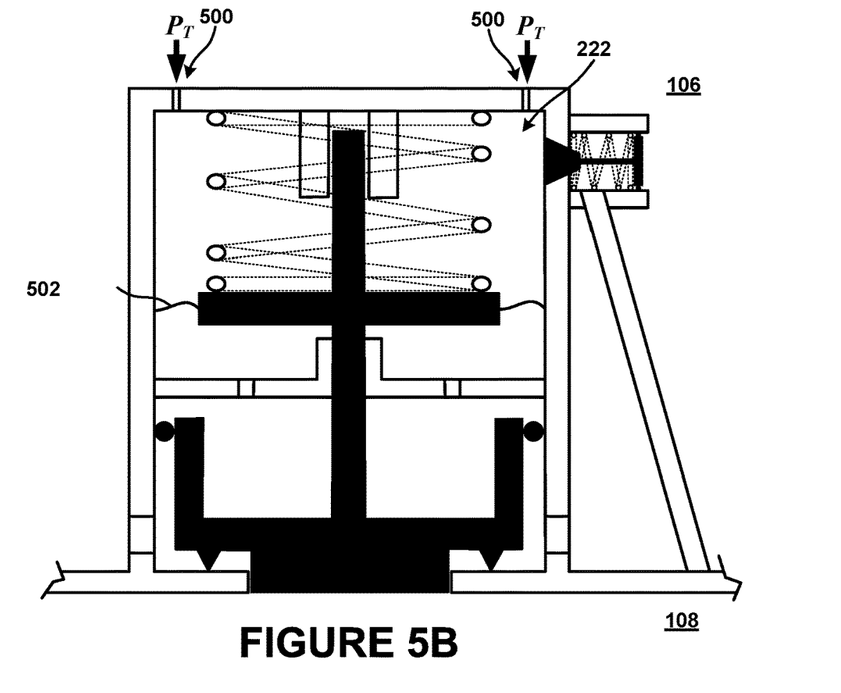

Turning briefly to FIGS. 5A and 5B, additional aspects of the relief valve 104 are illustrated, according to some additional illustrative embodiments. In particular, FIGS. 5A and 5B illustrate two other contemplated embodiments of the relief valve 104. In these embodiments, the poppet shaft bore annulus 218 shown in FIGS. 2-4 can be omitted, as mentioned above with reference to FIG. 2. The illustrated relief valves 104 can include apertures 500 for allowing flow of the tank pressure $P_T$ into the valve compartment 222. As shown in FIG. 5B, the poppet seal 212 can be replaced with a diaphragm 502, if desired. As explained above with reference to FIG. 2, the diaphragm 502 can be supplemented or substituted with additional or alternative structures. It should be understood that these embodiments are illustrative, and should not be construed as being limiting in any way.

Figure 6:
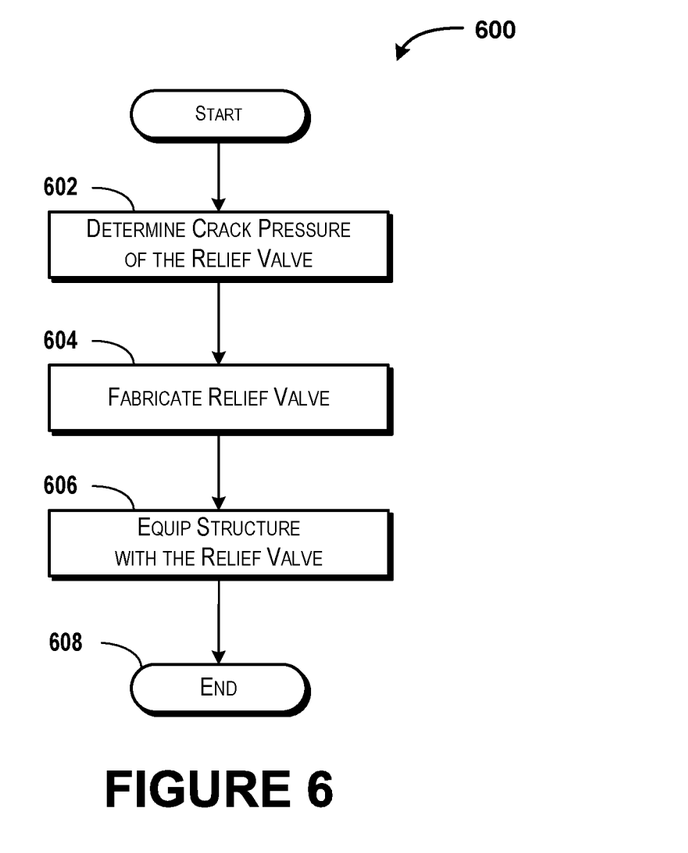
FIG. 6 is a flow diagram showing additional aspects of a method for controlling pressure using the pilot valve controlled positive and negative pressure relief valve, according to an illustrative embodiment.

Turning now to FIG. 6, aspects of a method 600 for controlling pressure of a structure using the relief valve 104 will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in their respective entireties. Some or all operations of the methods, and/or substantially equivalent operations, can be performed by a computer via execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that one or more of the logical operations described herein can be implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, one or more of the logical operations described herein may be implemented in software, in firmware, in special purpose digital logic, and/or any combination thereof.

The method 600 begins at operation 602, wherein a crack pressure of the relief valve 104 is determined. Although not shown in FIG. 6, it should be understood that the method 600 and/or other procedures or methods can include identifying a structure for which pressure control or regulation is needed or desired. In identifying the structure to be controlled, a desired pressure operating range can be identified and/or defined as well. Thus, operation 602 can include identifying a positive pressure threshold and/or a negative pressure threshold for the relief valve 104.

In one contemplated example, a fuel tank pressure is controlled by the relief valve 104. Thus, operation 602 can include determining a safe, optimal, and/or otherwise desired pressure operating range for the fuel tank. As mentioned above, the pressure operating range can include a positive pressure threshold and/or a negative pressure threshold. It should be understood that this embodiment is illustrative, and should not be construed as being limiting in any way.

In operation 602, the crack pressure of the relief valve 104 can be determined based upon the determined positive and/or negative pressure thresholds. In some embodiments, the crack pressure of the relief valve 104 is determined by a computer by execution of computer executable instructions for determining crack pressure of the relief valve based upon negative and/or positive pressure thresholds. Various algorithms, formulae, and/or other analysis operations can be executed by the computer to determine the crack pressure described herein. Furthermore, the computer can be configured to determine materials to be used to form the relief valve 104 and/or components thereof. For example, the computer can be configured to determine a material to be used for the various springs, seals, and/or poppets, among other components, as well as the dimensions such as lengths, heights, widths, thicknesses, diameters, or the like. Furthermore, the computer can determine placement of the seals and/or the size of areas of the poppets to be exposed to the tank pressure, the diameter of the poppet shaft bore annulus 218 and/or the apertures 502, or the like. Because the computer can be configured to determine substantially all aspects of the design of the relief valve 104, it should be understood that these embodiments are illustrative, and should not be construed as being limiting in any way.

From operation 602, the method 600 proceeds to operation 604, wherein the relief valve 104 can be fabricated. In particular, a valve body 202, which can be, but is not necessarily, defined at least partially by the tank boundary 200, can be formed. The primary valve poppet spring 216 and the primary valve poppet 204 can be inserted into the valve body 202 or the valve compartment 222. The primary valve poppet spring 216 and/or the primary valve poppet 204 can be inserted with the valve seal 206 and/or the poppet seal 212. As explained above, the materials used to form the primary valve poppet spring 216, as well as the weight, diameter, length, tension, and/or other aspects of the primary valve poppet spring 216 can be determined based upon a desired crack pressure of the relief valve 104, among other operating characteristics. Furthermore, the position of the valve seal 206 also can be determined based upon the desired crack pressure of the relief valve 104. Furthermore, the area of the portion 214 can be determined and the placement of the valve seal 206 can be based, at least partially, upon the desired area of the portion 214, among other considerations. It should be understood that this embodiment is illustrative, and should not be construed as being limiting in any way.

Operation 604 can further include forming a pilot valve 224 connected to and/or in communication with the valve compartment 222 of the relief valve 104. The pilot poppet 226, the pilot valve spring 234, and the pilot valve poppet seal 230 can be inserted into a pilot valve body 228 of the pilot valve 224. The ambient pressure sense line 242 can be formed or located in communication with the exterior space 108 and the interior of the pilot valve 224.

From operation 604, the method 600 proceeds to operation 606, wherein the structure is equipped with the relief valve 104. According to various embodiments, the relief valve 104 is located within the structure, for example, a tank 102. It should be understood that this embodiment is illustrative, and should not be construed as being limiting in any way. From operation 606, the method 600 proceeds to operation 608. The method 600 ends at operation 608.

Figure 7:
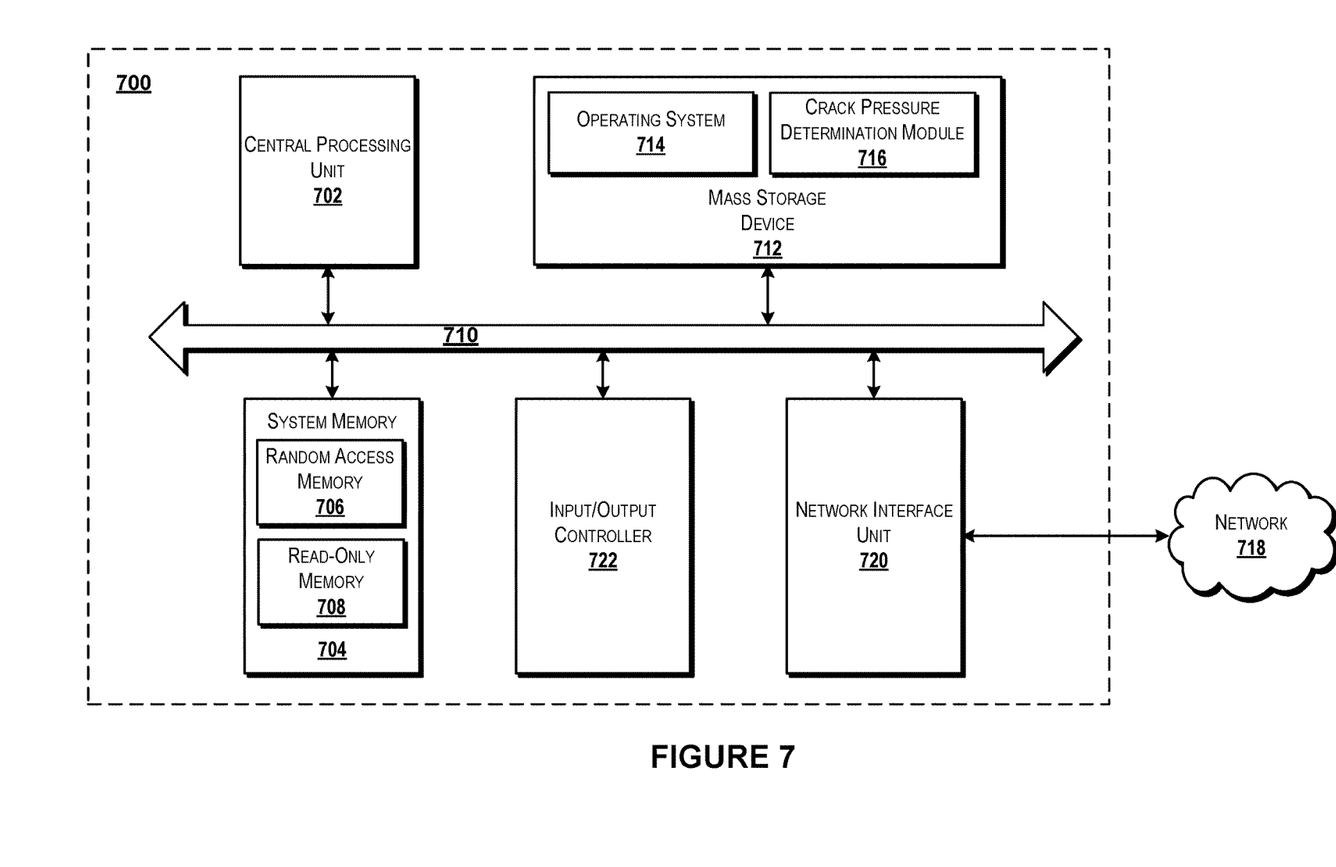
FIG. 7 is a computer architecture diagram illustrating an illustrative computer hardware and software architecture for a computing system capable of implementing aspects of the embodiments presented herein.

FIG. 7 shows an illustrative computer architecture 700 of a computer capable of executing the software components to determine a crack pressure of the relief valve 104, according to one embodiment. The computer may be embodied in a single computing device or in a combination of one or more processing units, storage units, and/or other computing devices. The computer architecture 700 includes one or more central processing units 702 ("CPUs"), a system memory 704 that includes a random access memory 706 ("RAM") and a read-only memory 708 ("ROM"), and a system bus 710 that couples the memory to the CPUs 702.

The CPUs 702 may be standard programmable processors that perform arithmetic and logical operations necessary for the operation of the computer architecture 700. The CPUs 702 may perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The computer architecture 700 also includes a mass storage device 712. The mass storage device 712 may be connected to the CPUs 702 through a mass storage controller (not shown) further connected to the bus 710. The mass storage device 712 and its associated computer-readable media provide non-volatile storage for the computer architecture 700. The mass storage device 712 may store an operating system 714, a crack pressure determination module 716 for determining a crack pressure of the relief valve 104, and/or other programs or modules. The mass storage device 712 also may store various data such as pressure tables, materials information, or the like.

The computer architecture 700 may store programs and data on the mass storage device 712 by transforming the physical state of the mass storage device to reflect the information being stored. The specific transformation of physical state may depend on various factors, in different implementations of this disclosure. Examples of such factors may include, but are not limited to, the technology used to implement the mass storage device 712, whether the mass storage device is characterized as primary or secondary storage, and the like. For example, the computer architecture 700 may store information to the mass storage device 712 by issuing instructions through the storage controller to alter the magnetic characteristics of a particular location within a magnetic disk drive device, the reflective or refractive characteristics of a particular location in an optical storage device, or the electrical characteristics of a particular capacitor, transistor, or other discrete component in a solid-state storage device. Other transformations of physical media are possible without departing from the scope and spirit of the present description, with the foregoing examples provided only to facilitate this description. The computer architecture 700 may further read information from the mass storage device 712 by detecting the physical states or characteristics of one or more particular locations within the mass storage device.

Although the description of computer-readable media contained herein refers to a mass storage device, such as a hard disk or CD-ROM drive, it should be appreciated by those skilled in the art that computer-readable media can be any available computer storage media that can be accessed by the computer architecture 700. By way of example, and not limitation, computer-readable media may include volatile and non-volatile, removable and non-removable media implemented in any method or technology for storage of information such as computer-readable instructions, data structures, program modules, or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 700. As used herein and in the claims, the phrase "computer storage medium" does not include transitory computer media such as propagated waves or signals, per se.

According to various embodiments, the computer architecture 700 may operate in a networked environment using logical connections to other systems or devices, which may be accessed through a network such as a network 718. The computer architecture 700 may connect to the network 718 through a network interface unit 720 connected to the bus 710. It should be appreciated that the network interface unit 720 may also be utilized to connect to other types of networks and remote computer systems. The computer architecture 700 also may include an input-output controller 722 for receiving input and providing output to various systems and devices such as a display. The input-output controller 722 may receive input from other devices as well, including a keyboard, mouse, electronic stylus, or touch screen associated with the computer or other systems or devices. Similarly, the input-output controller 722 may provide output to other displays, a printer, or other type of output device.

Based on the foregoing, it should be appreciated that concepts and technologies for pilot valve controlled positive and negative pressure relief valve are provided herein. Although the subject matter presented herein has been described in language specific to structural features and methodological acts, it is to be understood that the invention defined in the appended claims is not necessarily limited to the specific features or acts described herein. Rather, the specific features and acts are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

I claim:

1. A bidirectional relief valve comprising:
    a valve body disposed between a first space and a second space, the valve body at least partially defining a valve compartment, a flow path formed through the valve body configured to fluidly communicate between the first space and the valve compartment;
    a primary valve poppet located within the valve compartment and configured to close off a main relief valve outlet fluidly communicating between the valve compartment and the second space; and
    a pilot valve having a pilot valve seal disposed in a pilot valve flow path extending through the valve body, the pilot valve flow path configured to fluidly communicate between the first space and the valve compartment independently of the flow path, the pilot valve further having an opening into an ambient pressure sense line configured to fluidly communicate between the pilot valve and the second space, and comprising a pilot valve poppet with an exposed end of the pilot valve poppet that is directly exposed to the first space such that a pressure associated with the first space is continuously applied to the exposed end of the pilot valve poppet,
    wherein the configuration of the valve compartment, the primary valve poppet, and the pilot valve opens the fluid pathway between the first space and the second space in response to a threshold positive pressure differential between the first space and the second space and in response to a threshold negative pressure differential between the first space and the second space.

2. The relief valve of claim 1, further comprising a primary valve poppet spring located within the valve compartment and configured to bias the primary valve poppet into a sealed position at which the fluid pathway is obstructed.

3. The relief valve of claim 2, further comprising a poppet shaft bore annulus extending through the valve body and configured to fluidly communicate between the first space and the valve compartment independently of the flow path and the pilot valve flow path, the poppet shaft bore annulus further being configured to allow pressure equalization between the valve compartment and the first space.

4. The relief valve of claim 1, wherein the pilot valve further comprises:
    a pilot valve body;
    the pilot valve poppet located within the pilot valve body; and
    a pilot valve spring located between at least a portion of the pilot valve poppet and at least a portion of the pilot valve body, the pilot valve spring being configured to bias the pilot valve poppet into a sealed position at which the pilot valve flow path is obstructed by the pilot valve seal.

5. The relief valve of claim 1, wherein the pilot valve is configured to open at a crack pressure, and wherein opening of the pilot valve allows fluid to flow between the valve compartment and the second space, and wherein the first space comprises an interior of a fuel tank and the second space comprises an exterior space.

6. The relief valve of claim 1, further comprising:
    a valve seal between the primary valve poppet and at least a portion of the valve compartment; and
    a poppet seal between the pilot valve poppet and at least a portion of the pilot valve body.

7. The relief valve of claim 6, wherein the primary valve poppet comprises a portion exposed to the first space via the flow path, and wherein the primary valve poppet further comprises a poppet shaft configured to extend into the first space via a poppet shaft bore annulus.

8. The relief valve of claim 1, wherein the pilot valve is configured to open at a specified pressure, wherein the specified pressure is substantially equal to a tension of a pilot valve spring configured to close the pilot valve.

9. The relief valve of claim 1, wherein the relief valve is configured to open when a pressure within the first space exceeds a defined positive pressure threshold.

10. The relief valve of claim 1, wherein the relief valve is configured to open when a pressure within the first space falls below a defined negative pressure threshold.

11. The relief valve of claim 1, wherein the relief valve is configured to increase a force on the primary valve poppet while the pressure in the first space increases.

12. The relief valve of claim 11, wherein the relief valve is configured to increase the force until the pilot valve opens.

13. The relief valve of claim 1, wherein an aperture is formed in the valve body and configured to fluidly communicate between the first space and the valve compartment independently of the flow path and the pilot valve flow path, and wherein the ambient pressure sense line is configured to permit a first flow rate of fluid from the valve compartment to the second space that exceeds a second flow rate of fluid through the aperture from the first space to the valve compartment.

14. A tank, comprising:
    a relief valve that includes a valve body, the valve body being positioned within an interior space of the tank and including a valve compartment being configured to provide a fluid pathway between the interior space of the tank and an exterior space, the valve compartment comprising:
        a primary valve poppet located within the valve compartment;
        a poppet shaft connected to the primary valve poppet, at least a portion of the poppet shaft passing through a poppet shaft bore annulus, the poppet shaft bore annulus being configured to allow fluid flow between the interior space and the valve compartment; and
        a pilot valve located in an opening into the valve compartment and within the interior space of the tank such that one end of the pilot valve abuts the valve compartment and an opposing end of the pilot valve abuts the interior space of the tank, a further opening into an ambient pressure sense line between the pilot valve and the exterior space,
    wherein the relief valve is configured to at least partially relieve a positive and a negative pressure differential between the interior space and the exterior space.

15. The tank of claim 14, wherein the valve compartment and the exterior space via the ambient pressure sense line has a first flow rate that exceeds a second flow rate between the interior space and the valve compartment.

16. The tank of claim 14, wherein the pilot valve further comprises:
    a pilot valve body;
    a pilot valve poppet located within the pilot valve body and comprising the exposed end that is directly exposed to the interior space; and
    a pilot valve spring located between at least a portion of the pilot valve poppet and at least a portion of the pilot valve body, the pilot valve spring being configured to urge the pilot valve poppet into a sealed position at which the opening is obstructed by a pilot valve seal attached to the pilot valve poppet.

17. The tank of claim 14, further comprising a primary valve poppet spring located within the valve compartment, the primary valve poppet spring being configured to bias the primary valve poppet into a sealed position at which the fluid pathway is obstructed.

18. The tank of claim 14, wherein the pilot valve is configured to open at a crack pressure, and wherein opening of the pilot valve allows fluid to flow between the valve compartment and the exterior space via the ambient pressure sense line.

19. The tank of claim 14, further comprising:
a valve seal between the primary valve poppet and at least a portion of a tank boundary of the tank; and
a poppet seal between the primary valve poppet and at least a further portion of the tank boundary of the tank, wherein the primary valve poppet comprises a portion exposed to the interior space via a flow path formed in the valve compartment.

20. The tank of claim 14, wherein the relief valve is configured to open when a pressure within the interior space exceeds a defined positive pressure threshold, and wherein the relief valve is further configured to open when a pressure within the interior space drops below a defined negative pressure threshold.

21. The tank of claim 14, wherein the relief valve is configured to increase force on the primary valve poppet when the pressure in the interior space increases until the pilot valve opens.

* * * * *